United States Patent [19]

McLaughlin

[11] Patent Number: 5,328,160
[45] Date of Patent: Jul. 12, 1994

[54] RUBBER-METAL BUSHING

[75] Inventor: Ronald J. McLaughlin, Maumee, Ohio

[73] Assignee: The Pullman Company, Lebanon, N.J.

[21] Appl. No.: 11,113

[22] Filed: Jan. 29, 1993

Related U.S. Application Data

[63] Continuation of Ser. No. 666,235, Mar. 8, 1991, abandoned.

[51] Int. Cl.$^5$ .................................................. F16F 1/38
[52] U.S. Cl. .................................. 267/141.3; 267/293; 384/273
[58] Field of Search ............... 267/141.2, 141.3, 141.4, 267/141.5, 141.7, 292, 293; 280/716; 384/272, 273, 275; 29/898.054, 898.056, 898.057

[56] References Cited

U.S. PATENT DOCUMENTS

| 2,659,619 | 11/1953 | Kishune et aql. | 267/293 |
| 3,975,007 | 8/1976 | Chorkey | 267/141.4 X |
| 4,767,108 | 8/1988 | Tanaka et al. | 267/141.2 X |
| 4,909,638 | 3/1990 | Muto | 384/273 |
| 5,131,638 | 7/1992 | Hein et al. | 267/141.4 |

FOREIGN PATENT DOCUMENTS

| 384799 | 8/1990 | European Pat. Off. | 267/292 |
| 247832 | 10/1989 | Japan | 267/293 |
| 390197 | 3/1933 | United Kingdom | 384/273 |

Primary Examiner—Robert J. Oberleitner
Assistant Examiner—Alfred Muratori
Attorney, Agent, or Firm—William Squire

[57] ABSTRACT

A rubber-metal bushing includes a seamless inner metal DOM tube surrounded by an elastomer cylinder. A flanged ferrule is press fit into one or both ends of the tube so that the flange engages an end portion of the cylinder. The bushing is cost reduced by replacing the DOM tube with a seamed tube formed from flat stock. An adhesive at the tube-ferrule interface maintains the two elements together.

9 Claims, 1 Drawing Sheet

RUBBER-METAL BUSHING

This application is a continuation of application Ser. No. 07/666,235, Mar. 8, 1991, abandoned.

BACKGROUND OF THE INVENTION

The present invention relates to an improved rubber-metal bushing and, more particularly, to an improved farruled rubber-metal bushing intended for use in the automotive structures. The present invention also relates to a method of producing such a bushing.

A typical rubber-metal bushing used in automobile suspensions to reduce or control vibration, ride, handling and noise comprises a central, inner metal tube which is surrounded by an elastomeric member. Both the tube and the member have a generally cylindrical geometry. The elastomer may be natural rubber or other selected elastomer having a selected durometer.

In use, a bolt is run through the inner metal tube and through adjacent structural or suspension members of an automobile frame. A nut is run onto the free end of the bolt and the mendsera are interconnected via the bushing by tensioning the bolt shaft between its head and the nut. The ends of the bushing, particularly the end surfaces of the elastomeric member, may bear against the structural/suspension members and/or the head of the bolt or the nut.

In the past where increased bearing surface or wearability of the bushing was required, ferrules were included in the bushing. These ferrules have comprised metallic cylindrical bodies and an integral annular flange. The cylindrical body of the ferrule is inserted into the inner metal tube of the bushing, with the flange overlying a selected amount of the end surface of the elastomeric member. The flange provides the increased bearing surface and wearability.

Where ferrules have been used as described above, they have typically been press-fit into the inner metal tube. Press fitting has been used to insure that the ferrules remain in place during shipment to their end users and when employed in automobile suspensions by automatic feeding equipment. To ensure that the ferrule-inner metal tube press-fit retained its integrity, the inner metal tube has usually been fabricated from seamless tubing which has been drawn over a mandrel ("DOM" tubing). Seamed tubes formed from flat stock ( which are standard in bushings not including ferrules) have until now been deemed unsuitable for bushings with press-fit ferrules. Such unsuitability has been thought to derive from the tendency of the seam of such tubing to open up following ferrules being press-fit thereinto. This quality of seamed tubing is often referred to as lack of "hoop strength".

The cost of high hoop strength DOM tubing is about two to three times that of formed tubes having seams. The initial acquisition cost of DOM tubing is higher than that of flat stock, and DOM tubing must be first cut to length and then finished on special equipment.

An object of the present invention is the formation of reliable rubber-metal bushings using seamed tubes and press-fit ferrules.

SUMMARY OF THE INVENTION

With the above and other objects in view, the present invention contemplates an improved rubber-metal bushing. In general, such a bushing has an inner metal tube surrounded by an elastomer member. Typically the tube and the interior and exterior of the elastomer member are generally cylindrical. Such a bushing also includes a flanged ferrule which is press-fit into the metal tube so that the flange overlies a selected portion of the end surface of the elastomer member.

In the improved bushing the tube is a seamed tube, ordinarily formed from flat stock. An adhesive is applied to the interface between the seamed metal tube and the ferrule. The adhesive is preferably an anerobic adhesive, a cyanoacrylate adhesive or an epoxy adhesive, all of which, when cured, offer high resistance to removal of the ferrule from the tube, thereby compensating for the ordinarily experienced low hoop strength of the tube and the relatively low frictional force exerted on the ferrule by the tube.

The method hereof includes steps for producing the above-described improved bushing.

DETAILED DESCRIPTION

Figure 1:
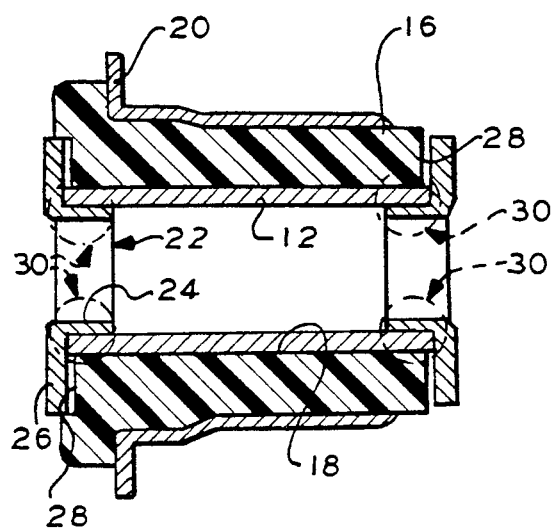
FIGS. 1 and 3 are sectioned, plan views of embodiments of an improved rubber-metal bushing according to the present invention and taken along lines 1—1 and 2—2, respectively, in FIGS. 2 and 4.
Figure 3:
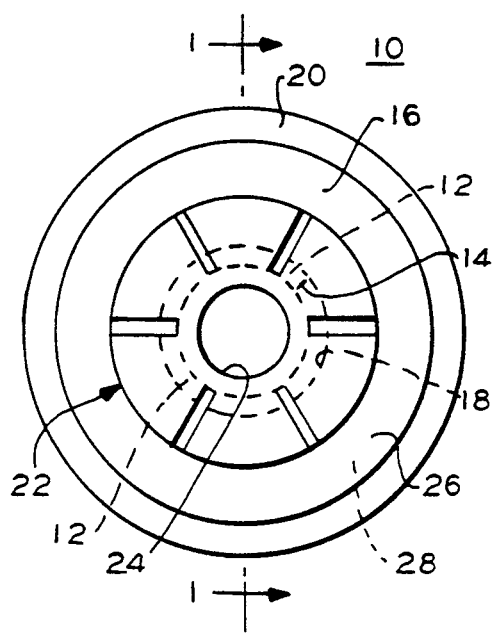

FIGS. 1 and 3 depict a double-ferruled, rubber-metal bushing 10 of the type marketed under the trademark Silentbloc. The bushing 10 is generally similar to those of the prior art, but is improved by the principles of the present invention.

Figure 2:
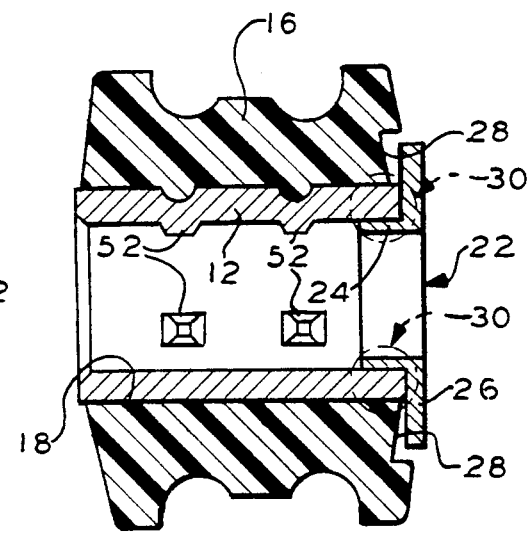
FIGS. 2 and 4 are end views of the bushings of FIGS. 1 and 3.
Figure 4:
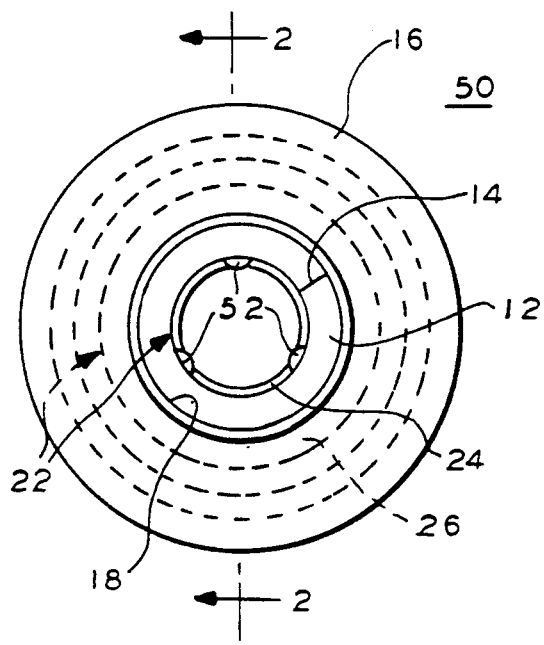

The bushing 10 includes an inner metal, generally cylindrical, tube 12 fabricated from flat rolled steel stock and, accordingly, having a seam 14 (FIGS. 2 and 4). In prior art bushings, the tube 12 is a seamless DOM tube which has been cut to length in special equipment and has had its ends machined to remove resulting burrs. When the tube 12 is fabricated from flat rolled stock, the cost thereof is about $\frac{1}{3}$ to $\frac{1}{2}$ of the cost of a corresponding DOM tube. The seamed tube 12 has a lower hoop strength than a corresponding DOM tube. The flat rolled stock may be any material that can be formed with conventional forming methods including low and high carbon steel, high strength low alloy steel, and other alloy steels such as stainless alloys. Other metals such as aluminum could likewise be used. The metals could be heat treated, using nitriding, carbonitriding, or through hardening techniques.

The bushing 10 also includes an elastomeric member 16 made of natural rubber or other appropriate elastomer having properties which are consistent with the particular application or are known to those skilled in the arts. The member 16 is generally cylindrical and contains a generally cylindrical bore 18 into which the tube 12 is inserted. A metal outer tube 20 fabricated from low carbon steel or similar material may surround the exterior of the member 16. The elastomer member 16 may be bonded in any convenient manner to one or both of the inner and outer tubes 12 and 20.

Press-fit into one or both ends of the tube 12 are ferrules 22 which may be manufactured from low carbon heat treated steel, high strength low alloy steel or other suitable materials. Each ferrule 22 includes a cylindrical body 24 and an integral flange 26 which overlies a portion of the end surface 28 of the elastomeric member 16 to provide increased bearing surface and wearability. In prior art bushings, the DOM tube has had sufficient hoop strength to resist the removal of a properly press-fit ferrule 22. However, as noted above, DOM tubes are costly. Moreover, press-fitting the ferrules 22 into DOM tubes presents some difficulties.

Specifically, it is difficult to hold the DOM tubes stationary and stable on high-rate automatic pressing equipment. As a result, the bodies 24 of the ferrules 22 are not always centered with and coaxial to the DOM tube as press-fitting takes place. This results in metal in the press-fit region becoming damaged or scarfed. This, in turn, can lead to a poor press-fit and as a result: the insecurely retained ferrule 22 may fall off the DOM tube either in transit or in automatic feeding or assembly equipment.

One of the benefits of using the formed tube 12 with the seam 14 is that the press-fit operation may be carried out more expediently and reliably. The lower hoop strength of the seamed tube 12 renders it more "forgiving" and permits its diameter to open up and and its walls to flex if the tube 12 and the body 24 of a ferrule 22 are misaligned during press-fitting. An additional, and possibly the primary, benefit of the formed tube 12 vis-a-vis a DOM tube is a significant decrease in the cost of the tube 12 and, hence, of the bushing 10, as noted above.

The lower retention force exerted on the ferrules 22 due to the lower hoop strength of the formed, seamed tube 12 (as compared to a DOM tube) is compensated for by applying a suitable adhesive to the interface between the tube 12 and the ferrules 22. These interfaces and the adhesive thereat are generally designated by the reference numeral 30.

Suitable adhesives 30 are those that exhibit sufficient resistance to slowly applied tensile loads, to pull-off or press out loads, to shock loads (of the type experienced in automotive suspensions) and to any shear forces tending to remove the ferrules 22 from the tube 12 in the use environments of the bushing 10, namely, in controlling, vibration, ride, handling and noise in automotive suspensions and similar environments. Particular adhesives 30 include anerobic adhesives, cyanoacrylate adhesives, epoxy adhesives and other organic adhesives, Henkel Omnifit 1750 anerobic adhesive, 3M CA-8 adhesive and Loctite Ultraspeed 12828 are preferred. Acceptable adhesives 30 result with the tube-ferrule 12-22 being capable of withstanding press-out loads of about 400 pounds.

Preferably, the adhesive 30 is applied to the interfacial surfaces and is then wiped during press-fitting the ferrule body 24 into the tube 12. Thereafter, the adhesive is cured.

FIGS. 2 and 4 illustrate a bushing 50 having similar elements which bear the same reference numerals as the bushing 10 of FIG. 1. The bushing 50 is a radial pressure bushing and includes a single ferrule 22 in contrast to the two ferrules of FIG. 1. The bushing 50 also includes no outer tube 20.

The seamed inner tube 12 of the bushing 50 is dimpled as at 52. The dimples 52 impart greater radial stiffness to the tube 12 and serve as an aid in accurately holding the tube 12 during press-fitting the ferrule 22 thereinto and in later mounting the tube 12 to a bolt shank when the bushing 50 is mounted in an automotive suspension. The dimples 52 are conveniently formed when the flat stock from which the tube 12 is fabricated is still flat. Similar dimples cannot as conveniently, if at all, be formed in DOM tubes.

An additional advantage of using the adhesive 30 is that it acts as a lubricant during press-fitting the ferrule 22 into the tube 12. Thus, both the "forgiveness" of the seamed tube 12 and the lubricity of the uncured adhesive 30 render the press-fitting operation expedient and easy to properly achieve.

What has been disclosed and described in detail are preferred embodiments of the invention. It will be recognized, however, that modifications may be made thereto and other embodiments contemplated without departing from the spirit and scope of the invention as set out in the following claims.

I claim:

1. An improved bushing for bearing column loads including an inner metal tube surrounded by an elastomer cylinder and a flanged ferrule press-fit into the metal tube at one tube end, the flange of the ferrule overlying a selected portion of an end surface of the elastomer cylinder, wherein the improvement therewith comprises:

the tube having a cylindrical wall defining a longitudinal axis along which said column loads are borne and a seam extending in the tube wall parallel to the axis; and an adhesive at the interface of the metal tube and the ferrule.

2. An improved bushing as in claim 1, wherein:
the adhesive is selected from the group consisting of anerobic adhesives, cyanoacrylate adhesives, and epozy adhesives.

3. An improved bushing as in claim 1, which further comprises dimples on the interior wall of the tube.

4. An improved bushing as in claim 1, wherein:
the tube is steel.

5. An improved bushing as in claim 1, wherein:
the elastomer cylinder and the tube are bonded together.

6. An improved bushing as in claim 1, wherein:
the adhesive is an anerobic adhesive, a cyanoacrylate adhesive or an epoxy adhesive.

7. An improved bushing as in claim 6, wherein:
the adhesive is an anerobic adhesive.

8. An improved bushing as in claim 6, which further comprises dimples on the interior wall of the tube.

9. An improved bushing as in claim 8, wherein:
the tube is steel; and
the elastomer cylinder and the tube are bonded together.

* * * * *